United States Patent
Belveze et al.

[11] Patent Number: 5,917,861
[45] Date of Patent: Jun. 29, 1999

[54] METHOD OF DIGITAL DEMODULATION

[75] Inventors: Fabrice Belveze, Maurepas; Xavier Lasne, Beynes; Albert Roseiro, Courbevoie, all of France

[73] Assignee: Matra Communication, Quimper, France

[21] Appl. No.: 08/900,397

[22] Filed: Jul. 21, 1997

[30] Foreign Application Priority Data

Jul. 24, 1996 [FR] France .................................. 96 09310

[51] Int. Cl.$^6$ .................................................. H03D 1/00
[52] U.S. Cl. .......................................... 375/340; 371/43.6
[58] Field of Search .................... 375/262, 341, 375/340, 347; 371/43.6, 43.7

[56] References Cited

U.S. PATENT DOCUMENTS

| | | |
|---|---|---|
| 4,328,582 | 5/1982 | Battail et al. . |
| 5,030,725 | 7/1991 | Koch . |
| 5,077,743 | 12/1991 | Bitzer et al. ............................ 371/43.7 |
| 5,151,904 | 9/1992 | Reiner et al. ............................ 371/43.7 |
| 5,230,003 | 7/1993 | Dent et al. ............................... 371/43.6 |
| 5,400,362 | 3/1995 | Chennakeshu et al. . |
| 5,467,374 | 11/1995 | Chennakeshu et al. . |
| 5,608,737 | 3/1997 | Kimura et al. ............................. 371/30 |
| 5,659,579 | 8/1997 | Herzberg ................................. 375/262 |

FOREIGN PATENT DOCUMENTS

| | | |
|---|---|---|
| 0520969 | 12/1992 | European Pat. Off. . |
| 0535403 | 4/1993 | European Pat. Off. . |
| 0594551 | 4/1994 | European Pat. Off. . |
| 0671817 | 9/1995 | European Pat. Off. . |
| 2247812 | 3/1992 | United Kingdom . |
| WO95/08889 | 3/1995 | WIPO . |

OTHER PUBLICATIONS

B.E. Rimoldi: "A Decomposition Approach to CPM" IEEE Transactions on Information Theory, vol. 34, No. 2, Mar. 1988, pp. 260–270.

P.A. Laurent: Exact and Approximate Construction of Digital Phase Modulations by Superposition of Amplitude Modulated Pulses (AMP) IEEE Transactions on Communications, vol. Com.34, No. 2, Feb. 1986 pp. 150–160.

J.H. Lodge et al.: "Maximum Likelihood Sequence Estimation of CPM Signals Transmitted Over Rayleigh Flat–Fading Channels" IEEE Transactions on Communications, vol. 38, No. 6, Jun. 1990, pp. 787–794.

K. Murota et al. "GMSK Modulation for Digital Mobile Radio Telephony" IEEE Transactions on Communications, vol. Com 29, No. 7, Jul. 1981 pp. 1044–1050.

*Primary Examiner*—Temesghen Ghebretinsae
*Assistant Examiner*—Lenny Jiang
*Attorney, Agent, or Firm*—Kilpatrick Stockton LLP

[57] ABSTRACT

A receiving device performs N separate demodulations (N≧2) each supplying respective estimates of successive binary symbols resulting from differential coding of a sequence of bits sent by a transmitting device, the differential coding being of the form $a_k c_k \oplus a_{f(k)}$ where $a_k$ and $c_k$ designate the binary symbol at position k and the bit at position k, f(k) designates an integer equal to k−1 at most and $\oplus$ designates the exclusive-OR operation. Each estimate of a binary symbol at position k is a real number $s_k^{(i)}$ (1=i=N) the sign of which represents the most probable value of the symbol and the modulus of which measures the likelihood of the most probable value. The value of a bit at position k of the sequence is estimated on the basis of the number:

$$\max_{1 \leq i \leq N} \{|s_k^{(i)} + s_{f(k)}^{(i)}|\} - \max_{1 \leq i \leq N} \{|s_k^{(i)} + s_{f(k)}^{(i)}|\}$$

9 Claims, 5 Drawing Sheets

METHOD OF DIGITAL DEMODULATION

BACKGROUND OF THE INVENTION

The present invention relates to a method of digital demodulation.

It applies particularly to a receiving device implementing a reception diversity technique.

Diversity techniques are well known in the field of digital transmission. Among these techniques, mention may be made of:

- spatial diversity, which can be used especially in radio transmission when several receiving sensors are arranged at different sites;
- frequency diversity, when the same information is sent simultaneously on different frequencies;
- time diversity, in the case where the same information is repeated.

These various diversity techniques can also be combined with each other. The benefit of these techniques is that they make it possible to improve binary error rates in the estimates produced by the receiving device. Against that, they generally have the drawback of requiring additional resources in terms of passband and/or of complexity of the transmitting and receiving devices.

Numerous methods exist for combining the multiple estimates obtained by the diversity receiver, among which mention may be made of:

- the selection method, consisting simply in choosing the observation exhibiting the best signal/noise ratio;
- the method known as "equal gain combining", in which a decision is taken on the basis of the sum of the observations after they have been brought into phase;
- the method known as "maximum ratio combining", in which a decision is taken on the basis of the sum of the squares of the observations brought into phase and divided by the estimated power of the noise by which they are affected. This latter method supplies a maximum signal/noise ratio after recombination.

It may be that the observations available are not subjected to interference effects (noise, channel interference) which are completely non-correlated (particularly as far as channel interference is concerned). In this case, the conventional recombination methods do not achieve the expected results. Moreover, in digital transmissions, all that counts is the likelihood of the observations and the decision-taking which stems therefrom, in the maximum likehood sense; this aspect does not emerge explicitly in conventional methods.

One aim of the present invention is to provide an alternative, based on maximum likelihood, to the conventional methods for recombinations of estimates affected by various types of interference.

SUMMARY OF THE INVENTION

Hence the invention proposes a method of digital demodulation, in which a receiving device performs N separate demodulations ($N \geq 2$) each supplying respective estimates of successive binary symbols $a_k$ resulting from differential coding of a sequence of bits $c_k$ sent by a transmitting device, the differential coding being of the form $a_k = c_k \oplus a_{f(k)}$ where $a_k$ and $c_k$ designate the binary symbol at position k and the bit at position k, f(k) designates an integer equal to k−1 at most and $\oplus$ designates the exclusive-OR operation, each estimate of a binary symbol $a_k$ at position k being in the form of a real number $s_k^{(i)}$ ($1 \leq i \leq N$), the sign of which represents the most probable value of the symbol and the modulus of which measures the likelihood of the most probable value. According to the invention, the receiving device estimates the value of a bit $c_k$ at position k of the sequence on the basis of a number of the form $X_k - Y_k$ where:

$$X_k = \max_{1 \leq i \leq N} \{|s_k^{(i)} + s_{f(k)}^{(i)}|\}$$

$$Y_k = \max_{1 \leq i \leq N} \{|s_k^{(i)} - s_{f(k)}^{(i)}|\}$$

It can be demonstrated that, whenever the level of the useful signal is sufficiently high with respect to that of the observation noise, the above estimate $X_k - Y_k$ is proportional to the likelihood of the bit $c_k$, that is to say to the logarithm of the ratio of the probability densities of the signal or signals received conditionally at the bit $c_k$ and conditionally at the logic complement of the bit $c_k$.

The overall demodulation thus obeys the law of maximum likelihood a posteriori, even in the presence of correlated errors in the various estimates of the symbols $a_k$.

The invention applies not only to the recombinations of multiple estimates obtained by a diversity technique, but also to the case where at least two of the N sets of estimates of the symbols $a_k$ are obtained by demodulating the same signal segment received by different methods (a case in point where, typically, the estimation errors will often be correlated).

In one particular embodiment, at least two of the N separate demodulations are performed on the same signal segment corresponding to a frame of symbols of a digital signal modulated by the transmitting device, the said signal segment being received by the receiving device after transmission of the modulated digital signal via a transmission channel, the first of these two demodulations comprising the following stages:

- estimation of first demodulation parameters at a first end of the segment; and
- calculation of first estimates of symbols of the frame on the basis of the first estimated demodulation parameters and of the signal segment covered from the first end to a second end, and the second of these two demodulations comprising the following stages:

- estimation of second demodulation parameters at the second end of the segment; and
- calculation of second estimates of symbols of the frame on the basis of the second estimated demodulation parameters and of the signal segment covered from the second end towards the first end.

This approach leads to appreciable gains in the binary error rate, from a single observation of the signal.

BRIEF DESCRIPTION OF THE DRAWINGS

Other features and advantages of the present invention will emerge in the description below of non-limiting embodiment examples, by reference to the attached drawings, in which.

DETAILED DESCRIPTION

Figure 1:
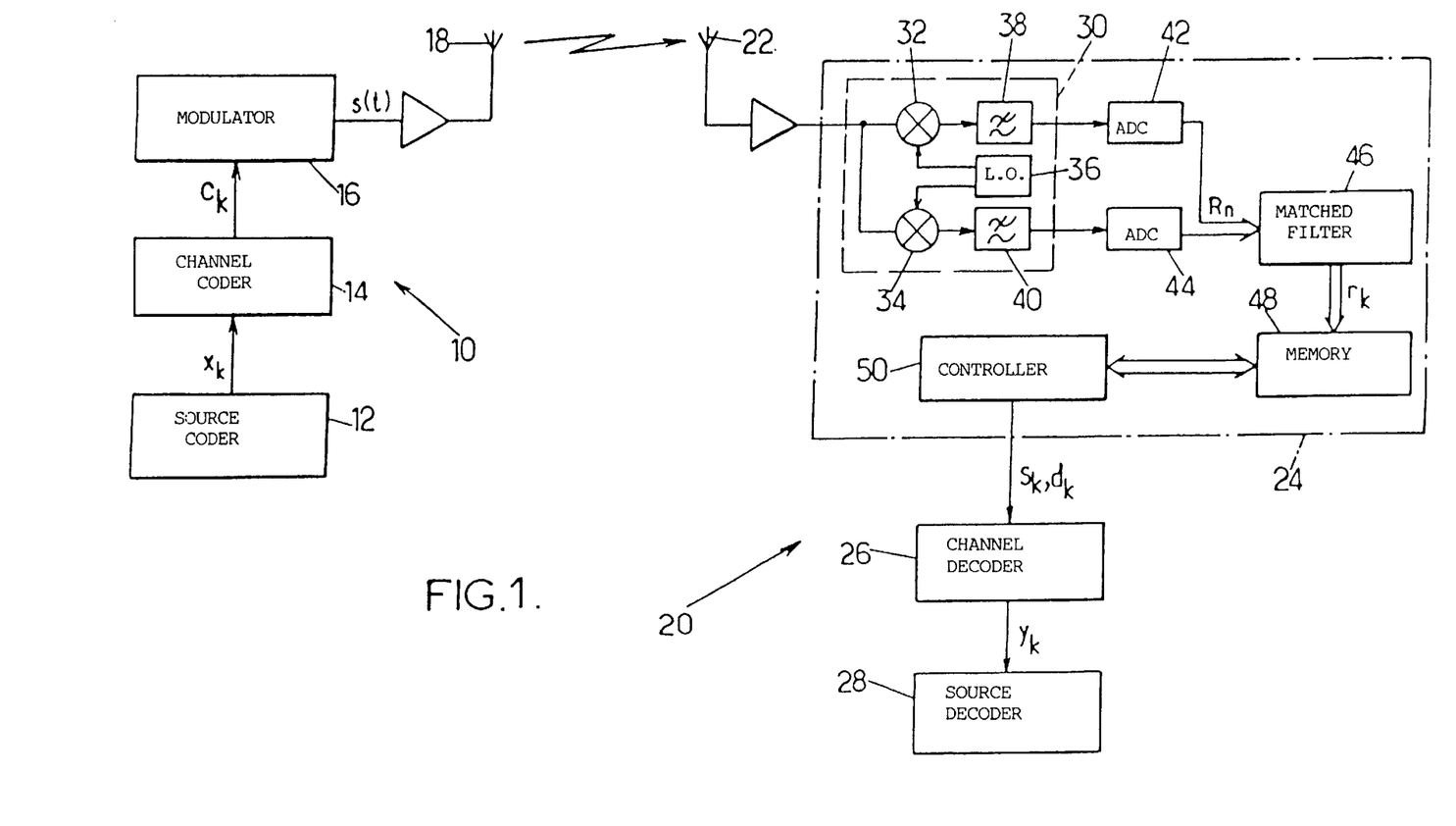
FIG. 1 is a block diagram showing a transmitting device and a receiving device implementing the present invention.

The invention is described below in its application to digital radio communication between a transmitting device 10 and a receiving device 20. The transmitting device 10 includes a source coder 12 (a vocoder in the case of a telephony system) which delivers a flow of digital data $x_k$ organized into successive frames. In the exemplary embodiment illustrated by FIG. 2, the signal $x_k$ is organized into frames of 126 bits at a data rate 1/T=8 kbits/s.

Figure 2:
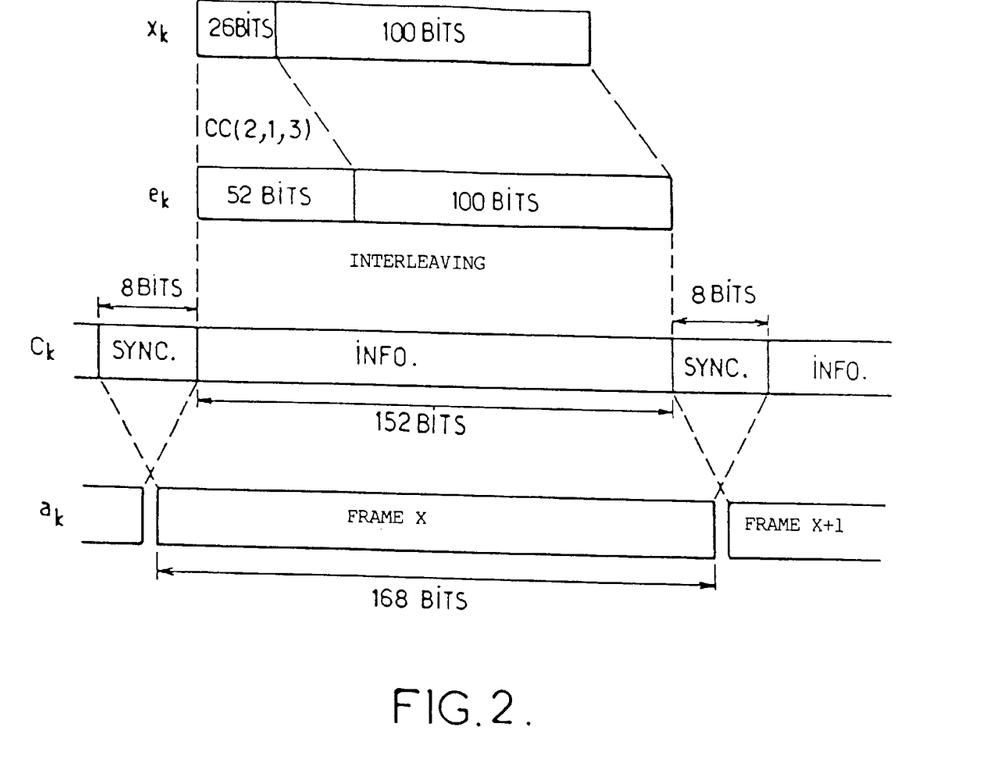
FIG. 2 is a diagram showing the structure of signal frames in one exemplary embodiment of the present invention.

A channel coder 14 processes the bits delivered by the source coder in order to enhance robustness to transmission errors. In the example of FIG. 2, the channel coder 14 applies a convolution code CC(2, 1, 3) of efficiency ½ to the first 26 bits of the frame $x_k$. The resulting 52+100=152 bits $e_k$ are then subjected to interleaving intended to break the packets of errors which the phenomenon of Rayleigh fading may introduce. An 8-bit synchronization word is inserted after each frame of 152 interleaved information bits so as to form the signal $c_k$ which the coder 14 sends to the modulator 16. The latter forms the radio signal s(t) which is amplified then applied to the antenna 18 of the sending device 10. In the example considered, the symbols $c_k$ are binary ($c_k$=0 or 1).

The modulation employed is, for example, GMSK modulation with a parameter BT=0.25 (see K. MUROTA et al: "GMSK modulation for digital mobile radio telephony", IEEE Trans. on Communications, Vol. COM-29, no. 7, July 1981, pages 1044–1050).

The receiving device 20 comprises a demodulator 24 receiving the signal picked up by the antenna 22 and amplified. The demodulator 24 delivers estimates of the symbols transmitted $c_k$. These estimates are denoted $S_k$ in the case of soft decisions, and $d_k$ in the case of hard decisions. If the symbols $c_k$ are M-ary and lie between 0 and M-1, one choice of possible representation for the soft estimate $S_k$ is in the form:

$$S_k = p_k \cdot \exp(2j\pi d_k/M),$$

that is to say that, in this case, its argument $2\pi d_k/M$ represents the most probable value $d_k$ of the symbol $c_k$, while its modulus $p_k$ is a measurement of the likelihood of this value $d_k$. In the case of binary symbols (M=2), the number $S_k$ is real and called "softbit", and its sign $2d_k$−1 directly gives the most probable value of the signed symbol $2c_k$−1.

The receiving device 20 includes a channel decoder 26 which is the image of the channel coder 14 of the transmitter. In the previously considered example, the channel decoder 26 carries out, frame by frame, the exchanging of the bits which is the reverse of that corresponding to the interleaving applied by the transmitter, and decodes the redundant 52 bits by using the Viterbi trellis corresponding to the convolution code employed. As is usual in digital transmission, the Viterbi decoding may be hard-decision decoding when the demodulator 24 supplies only the $d_k$ values, or soft-decision decoding when the demodulator 24 supplies the $S_k$ values.

The channel decoder 26 reproduces the estimates $y_k$ of the bits $x_k$, and delivers them to a source decoder 28 which restores the information transmitted.

As FIG. 1 shows, the demodulator 24 includes a radio stage 30 converting the signal received into baseband. By means of two mixers 32, 34, the radio signal received is mixed with two radio waves in quadrature at the carrier frequency which are delivered by a local oscillator 36, and the resultant signals are subjected to low-pass filters 38, 40 in order to obtain an in-phase component and a quadrature component. These two components are sampled and quantized by analog-digital converters 42, 44 at a frequency at least equal to the frequency of the transmitted bits. The complex samples of the digital signal at baseband, delivered by the converters 42, 44, are denoted $R_n$.

In the example represented in FIG. 1, the demodulator 24 operates according to a sequential algorithm to demodulate binary symbols. In the case of GMSK modulation, sequential demodulation can be carried out by using the following approximation for the modulated signal at baseband s(t):

$$s(t) = \sum_{k=-\infty}^{+\infty} j^k \cdot a_k \cdot h(t - kT) \tag{4}$$

This expression corresponds to a first-order approximation of the decomposition proposed by P. A. LAURENT in his article "Exact and Approximate Construction of Digital Phase Modulations by Superposition of Amplitude Modulated Pulses (AMP)", IEEE Trans. on Communications, Vol. COM-34, no. 2, February 1986, pages 150–160. This article also explains the method of calculating the function h(t), which, in the case of GMSK modulation with BT=0.25, corresponds to a pulse of width approximately 2T centered on t=0. In expression (4), the binary symbols $a_k$, with value ±1, correspond to the differentially coded bits $c_k$: $a_k = a_{k-1} \cdot (2c_k - 1)$.

The radio channel is affected by fading phenomena corresponding to the sum of multiple paths corresponding to the various reflections of the transmitted signal on nearby or distant obstacles. As the time dispersion of these paths is usually of the order of 12 µs, which is a short time compared with the duration of one bit (T=125 µs in the numerical example considered), the propagation channel is represented by a complex variable A(t) corresponding to Rayleigh attenuation and phase shifting with a single path. The frequency of the fading phenomena is $2f_d$, $f_d$ being the Doppler frequency associated with the variation in the distance between the transmitter and the receiver: $f_d = f_0 \cdot v/c$, if $f_0$ is the center frequency of the channel, v is the relative speed of the transmitter and of the receiver and c is the speed of light. This, for a speed of 100 km/h, yields a Doppler frequency of the order of 41.67 Hz in the case where $f_0 \sim 450$ MHz, giving fade (83.33 Hz) every 12 ms. This therefore allows more than one occurrence of fade per frame, and above all a frequency of fade higher than the frequency of the synchronization words (50 Hz).

The presence of these rapid fading phenomena, and, more generally, the rapid variation in the channel compared with the frame duration, dictates frequent estimation of the channel, and hence a considerable risk of error propagation due to the feedback action of the decision loop. This is because, if there are errors in the binary symbols decided upon at demodulation, these errors will lead to erroneous estimates of the channel, which will themselves produce further demodulation errors.

The complex values of the propagation channel sampled at 8 kHz in baseband are denoted $A_k = A(kT)$ (k=0 to 167). The channel is furthermore affected by additive Gaussian white noise B(t) with variance N0/2, denoted $B_k$ after sampling and matched filtering. The received signal, after matched filtering of the signal by the filter 46 with response h(t), is then of the form:

$$r_k = A(kT) \sum_{n=-\infty}^{\infty} j^n a_n H((n-k)T) + B(kT)$$

$$= A_k [j^{k-1} a_{k-1} H(-T_b) + j^k a_k H(0) + j^{k+1} a_{k+1} H(+T)] + B_k$$

where H(t) is the autocorrelation function known from the function h(t). In this expression, an approximation has been made consisting in ignoring H(t) for $|t| \geq 2T$, which simplifies the calculations.

The output samples $r_k$ from the matched filter 46 are stored in a memory 48 in order to be processed by the controller 50 of the demodulator 24.

The controller 50 processes the filtered signal $r_k$ in segments each corresponding to a frame of 168 transmitted binary symbols $a_k$ ($0 \leq k < 168$). As FIG. 2 shows, this frame, after the implicit differential coding of the bits $c_k$, corresponds to the 152 information bits of a frame bracketed by the 8 bits of the preceding synchronization word and by the 8 bits of the following synchronization word.

Figure 3:
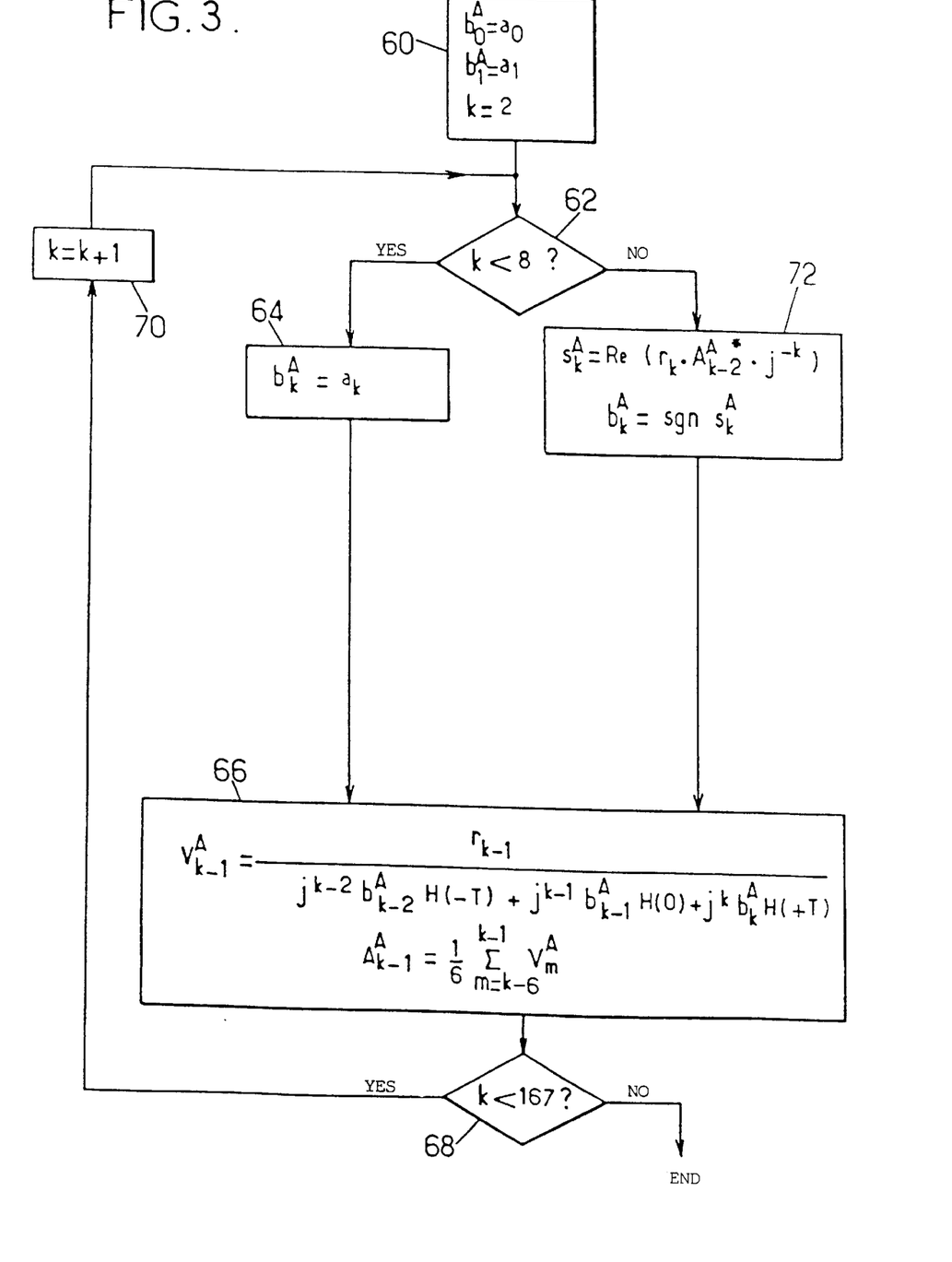
FIGS. 3 and 4 are flow charts of demodulation procedures applied by the receiving device in both demodulation directions.

The controller 50 performs the demodulation according to a sequential algorithm, a first phase of which is represented on the flow chart of FIG. 3. In this first phase, the complex response of the channel is firstly estimated at the start of the segment, then this segment is demodulated from start to finish, updating the estimate of the complex response of the channel at each bit time.

At the initialization 60 of this first phase, the bits $b_0^A$ and $b_1^A$ are taken respectively to be equal to the known binary symbols $a_0$ and $a_1$, and the index k is initialized to 2. At stage 62, the index k is compared to 8, that is to say to the length of the synchronization word. If k<8, the bit $b_k^A$ is taken to be equal to the known bit $a_k$ of the synchronization word at stage 64, then, at stage 66, an instantaneous estimate $V_{k-1}^A$ of the propagation channel is produced, by performing the complex division:

$$V_{k-1}^A = \frac{r_{k-1}}{j^{k-2} b_{k-2}^A H(-T) + j^{k-1} b_{k-1}^A H(0) + j^k b_k^A H(+T)} \quad (5)$$

A filtering of the instantaneous estimates $V_m^A$ allows the effects of the Gaussian noise to be smoothed so as to supply the estimate $A_{k-1}^A$ serving for demodulating the bits. In the example represented in FIG. 3, this filtering is simply the calculation of the arithmetic mean of the last 6 instantaneous estimates $V_m^A$. Other types of filtering could equally well be employed. After stage 66, the index k is compared to 167 (the length of the frame) at stage 68. As long as k<167, the index k is incremented by one unit at stage 70 before returning to stage 62.

The estimating of the channel at the start of the frame is terminated when k=8 at test 62. The estimate $A_6^A$ is then available, obtained by virtue of knowledge of the synchronization word. For each value of $k \geq 8$, the softbit $s_k^A$ is estimated at stage 72 according to:

$$s_k^A = Re(r_k \cdot A_{k-2}^{A*} \cdot j^{-k}) \quad (6)$$

and the estimate $b_k^A$ of the bit $a_k$ is obtained via the sign of the softbit $s_k^A$. Having obtained this bit $b_k^A$, the controller 50 re-estimates the channel at stage 66 as discussed above. The demodulation in the outwards direction is terminated when k=167 at test 68.

It can be seen in FIG. 3 that an error made on one bit $b_k^A$ at stage 72, due, for example, to fading of the channel or to impulse noise, causes distortions in the instantaneous estimates $V_{k-1}^A$, $V_k^A$ and $V_{k+1}^A$ made at the following three stages 66, and thus leads to errors in estimating the channel which propagate for a certain time due to the smoothing filter. These errors in the $A_k^A$ values can, in their turn, generate other errors in estimating the bits.

Figure 5:
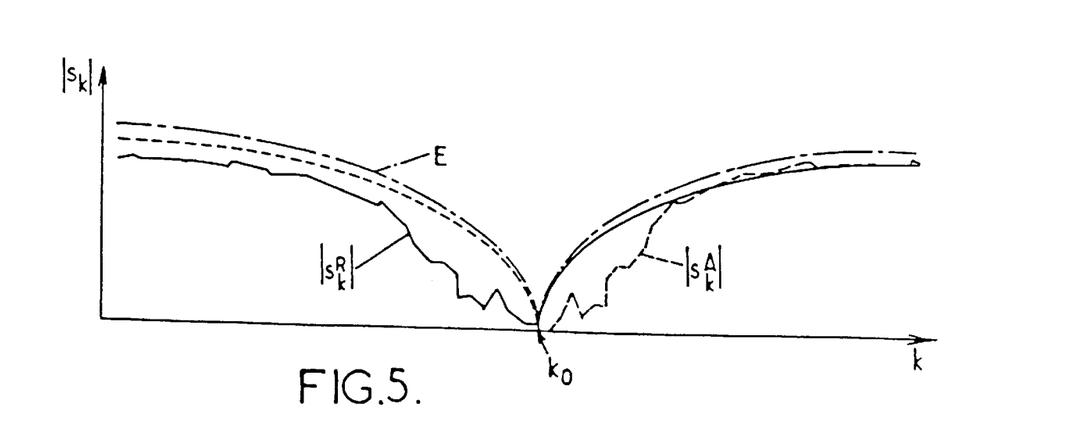
FIG. 5 is a graph showing examples of likelihoods obtained in each demodulation direction.

Hence FIG. 5 shows, in the case where the received signal energy changes follows the curve E in dots and dashes (with channel fading occurring at the instant $k_0$), that the likelihood $|s_k^A|$ of the estimates (curve in broken line) is good before the fade, but then takes a certain time to regain values in keeping with the energy E of the received signal.

In order to enhance performance in the period following the fade, the controller 50 carries out another demodulation of the signal segment corresponding to the 168-bit frame from the end of the segment towards the start. This makes it possible to obtain likelihoods $|s_k^R|$ such as those represented by the curve in solid line in FIG. 5. It can be seen that the performance of the demodulator will be enhanced if the softbits $s_k^A$ are preferred before the fade and the softbits $s_k^R$ after the fade.

Figure 4:
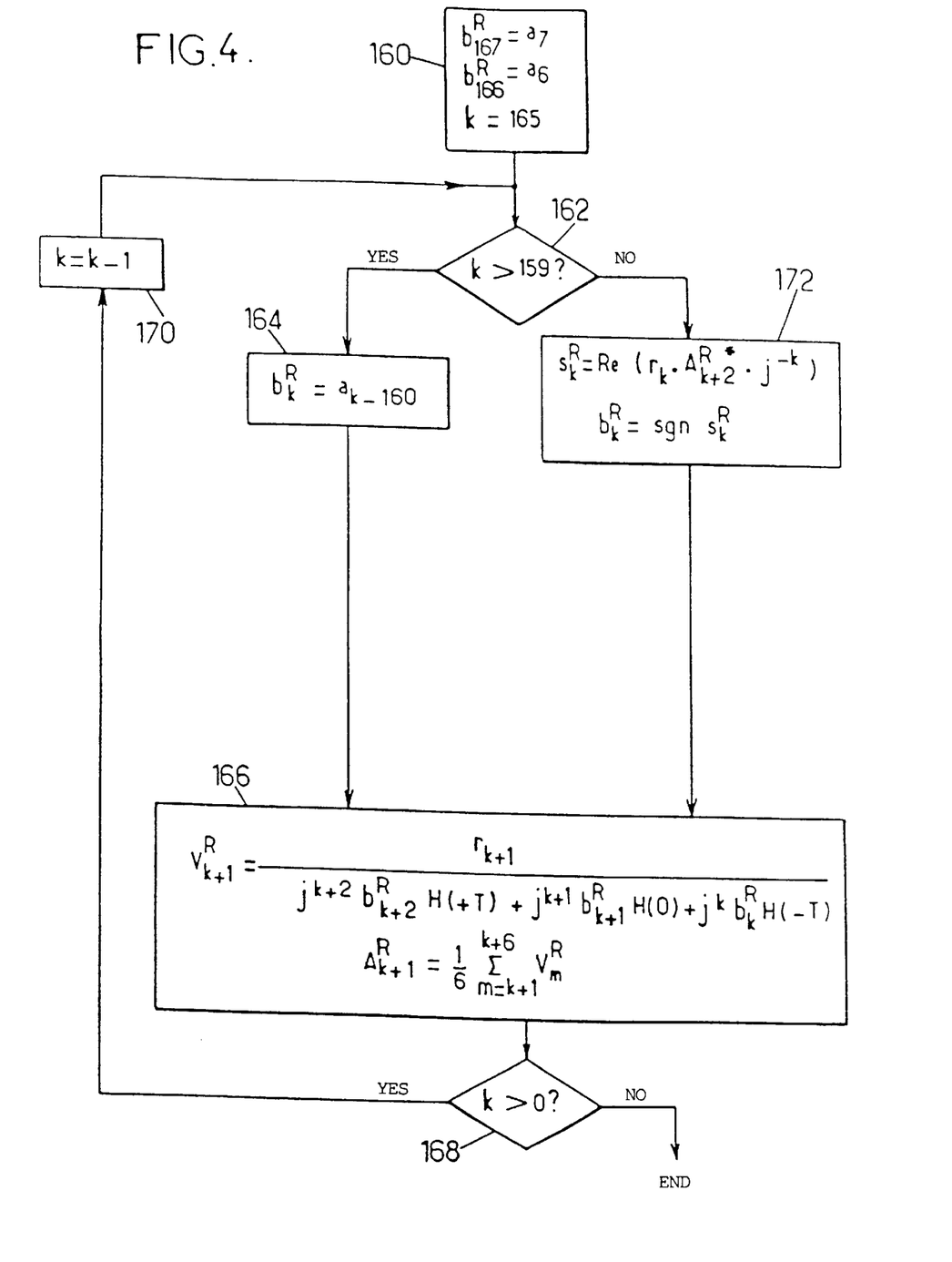

The return demodulation is performed in a second phase similar to the first one, the flow chart for which is represented in FIG. 4. This second phase commences with an estimate of the complex response of the channel at the end of the segment, then this segment is demodulated from the end to the start, updating the estimate of the complex response of the channel at each bit time.

At the initialization 160 of this second phase, the bits $b_{167}^R$ and $b_{166}^R$ are respectively taken to be equal to the known binary symbols $a_7$ and $a_6$, and the index k is initialized to 165. At stage 162, the index k is compared to 159. If k>159, the bit $b_k^R$ is taken to be equal to the known bit $a_{k-160}$ of the synchronization word at stage 164, then, at stage 166, an instantaneous estimate $V_{k+1}^R$ of the propagation channel is produced, by performing the complex division:

$$V_{k+1}^R = \frac{r_{k+1}}{j^{k+2} b_{k+2}^R H(+T) + j^{k+1} b_{k+1}^R H(0) + j^k b_k^R H(-T)} \quad (7)$$

A filtering of the instantaneous estimates $V_m^R$ allows the effects of the Gaussian noise to be smoothed so as to supply the estimate $A_{k+1}^R$ serving for demodulating the bits. In the example represented in FIG. 4, this filtering is simply the calculation of the arithmetic mean of the last 6 instantaneous estimates $V_m^R$. After stage 166, the index k is compared to 0 at stage 168. As long as k>0, the index k is decremented by one unit at stage 170 before returning to stage 162.

The estimating of the channel at the end of the frame is terminated when k=159 at test 162. The estimate $A_{161}^R$ is then available, obtained by virtue of knowledge of the synchronization word. For each value of $k \geq 159$, the softbit $s_k^R$ is estimated at stage 172 according to:

$$s_k^R = Re(r_k \cdot A_{k+2}^{R*} \cdot j^{-k}) \quad (8)$$

and the estimate $b_k^R$ of the bit $a_k$ is obtained via the sign of the softbit $s_k^R$. Having obtained this bit $b_k^R$, the controller 50 re-estimates the channel at stage 166 as discussed above. The demodulation in the return direction is terminated when k=0 at test 168.

In the example considered above, the demodulation parameters which are re-estimated while moving through the demodulated segment in each direction are limited to the complex response $A_k$ of the propagation channel. It will be understood that they could include other parameters, such as parameters representative of the noise observed on the transmission channel. It is thus possible, for each demodulation direction, to calculate a quadratic mean of the deviations $V_{k-1}^A - A_{k-1}^A$ (stage 66) or $V_{k+1}^R - A_{k+1}^R$ (stage 166), in order to estimate the instantaneous power of the noise $N0_k^A$, $N0_k^R$ in each demodulation direction. It is then possible to normalize the value of the softbit $s_k^A$ or $s_k^R$ by dividing it by this quadratic mean. The estimates of power $N0_k^A$, $N0_k^R$ may be constant over the frame in question; these are then, for example, averages of the $|A_{k-1}^A - V_{k-1}^A|^2$ and of the $|A_{k+1}^R - V_{k+1}^R|^2$ quantities calculated over the whole of the frame. If these averages are obtained over sliding windows or by filtering, the estimates of the noise power may be instantaneous, that is to say may depend on the index k.

Figure 6:
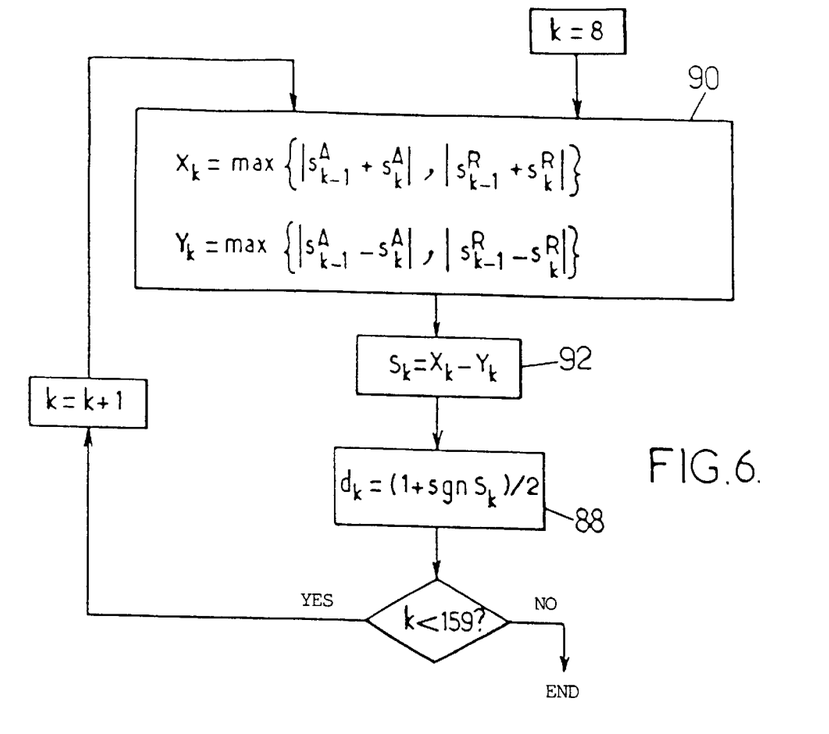
FIG. 6 is a flow chart drawing a way of combining the outward and return estimates according to the invention.

FIG. 6 shows one way of making use of the outward and return estimates of the transmitted symbols, by searching for the maximum likelihood a posteriori of the value of the bits transmitted.

The value of the softbit $S_k$ obtained after differential decoding is then:

$$S_k = X_k - Y_k \quad (9)$$

in which:

$$X_k = \max\{|s_{k-1}^A + s_k^A|, |s_{k-1}^R + s_k^R|\} \quad (10)$$

$$Y_k = \max\{|s_{k-1}^A - s_k^A|, |s_{k-1}^R - s_k^R|\} \quad (11)$$

as stages 90 and 92 illustrate in FIG. 6. The hard estimate $d_k$ of the bit $c_k$ is taken to be equal to $[1+\text{sgn}(S_k)]/2$ at stage 88. These stages 90, 92, 88 are executed for each value of k lying between 8 and 159 (for the calculation of $S_8$, $s_7^A = \text{Re}(r_7 \cdot A_6^{A*} \cdot j^{-7})$ is taken).

Simulations have made it possible to observe that, by comparison with demodulation in a single direction, outwards-and-return demodulation combined with exploitation of the results according to maximum likelihood (FIG. 6) leads to an improvement of 1.5 to 2 dB on the binary error rate, with signals constructed in a similar way to what was described with reference to FIG. 2 and with usual values of the Doppler frequency/bit frequency ratio.

It will be noted that the estimates $S_k$ calculated at stages 90 and 92 of FIG. 6 correspond to a maximum likelihood in the case where it can be considered that the observation noise is of the same power in both demodulation directions, which, in practice, generally constitutes a satisfactory approximation. If this approximation is not made, it is useful to normalize the softbits $s_k^A$, $s_k^R$ relative to the noise power, as discussed above, before calculating the maxima according to the relations (10) and (11).

In the example considered above, the symbols $a_k$ are descended from the bits $c_k$ via differential coding of the form $a_k = c_k \oplus a_{f(k)}$, where $f(k) = k-1$ and $\oplus$ designates the exclusive-OR operation which, in the case where the $a_k$ symbols are at values of ±1 and the $c_k$ bits at values of 0 or 1, is equivalent to $a_k = (2c_k - 1) \cdot a_{f(k)}$. In the general case, it suffices for the integer function f to satisfy $f(k) \leq k-1$, the quantities $X_k$ and $Y_k$ being:

$$X_k = \max\{|s_k^A + s_{f(k)}^A|, |s_k^R + s_{f(k)}^R|\} \quad (12)$$

$$Y_k = \max\{|s_k^A - s_{f(k)}^A|, |s_k^R - s_{f(k)}^R|\} \quad (13)$$

When $f(k) = k-1$, the relations (12) and (13) correspond to (10) and (11). An example application of differential coding where f(k) is not always equal to k−1 may be found in the European patent application 0 774 840.

Figure 7:
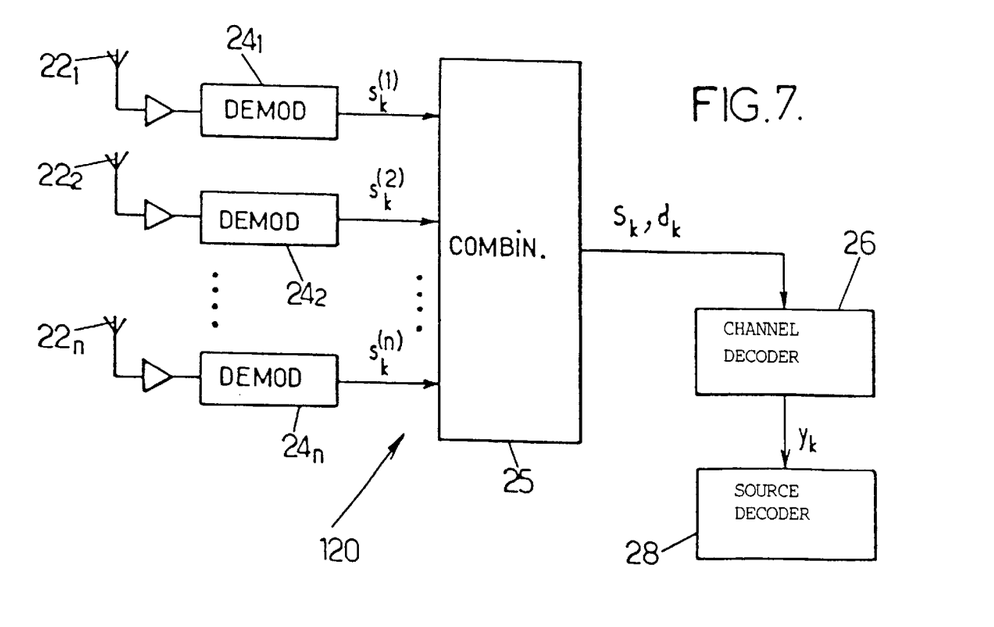
FIG. 7 shows another embodiment of a receiving device according to the invention.

FIG. 7 shows another example of a receiving device able to implement the present invention. This device 120 relies on receiving diversity which, in the example considered, is spatial diversity, the device including n antennae $22_1, \ldots, 22_n$ and n associated demodulators $24_1, \ldots, 24_n$. Each demodulator $24_i$ operates in a single direction on a respective signal segment supplied by its antenna $22_i$, and delivers respective softbits $s_k^{(i)}$ (normalized or otherwise) for each symbol $a_k$ before differential decoding. The device 120 thus has available N=n estimates per symbol originating from different signal segments, instead of N=2 estimates drawn from the same signal segment in the embodiment example of FIGS. 1 to 6.

A module 25 combines these various softbits to supply the soft estimates $S_k$ (and/or hard estimates $d_k$) of the decoded bits $c_k$ to the channel decoder 26. These combinations are formed according to relation (9) with $$X_k = \max_{1 \leq i \leq N} \{|s_k^{(i)} + s_{f(k)}^{(i)}|\} \quad (14)$$

$$Y_k = \max_{1 \leq i \leq N} \{|s_k^{(i)} - s_{f(k)}^{(i)}|\} \quad (15)$$

The demodulation carried out by each demodulator $24_i$ is, for example, in accordance with the flow chart of FIG. 3, the signals received differing from one demodulator to another and being denoted $r_k^{(i)}$ after matched filtering, and the estimates $b_k^A$ of the bits $a_k$ in the outward direction being replaceable by the estimates $b_k$ of these same bits after recombination. After having obtained the respective softbits $s_k^{(i)}$ at stage 72, the demodulators $24_i$ supply these softbits to the combining module 25 which calculates the estimates $S_k$ and $d_k$, then the bit $b_k$ by differential coding of the hard estimates $d_k$, that is to say $b_k = d_k \oplus b_{f(k)}$. The bit $b_k$ thus obtained is returned to the demodulators $24_i$ which can then calculate the estimates $V_{k-1}^{(i)}$ of the responses of the channels at stage 72 according to:

$$V_{k-1}^{(i)} = \frac{r_{k-1}^{(i)}}{j^{k-2}b_{k-2}H(-T) + j^{k-1}b_{k-1}H(0) + j^k b_k H(+T)}$$

The invention is, clearly, applicable to other diversity techniques, or to receivers combining a diversity technique with a method of multiple demodulations such as that described above.

We claim:

1. Method of digital demodulation, in which a receiving device performs N separate demodulations (N≧2) each supplying respective estimates of successive binary symbols ($a_k$) resulting from differential coding of a sequence of bits ($c_k$) sent by a transmitting device, the differential coding being of the form $a_k = c_k \oplus a_{f(k)}$ where $a_k$ and $c_k$ designate the binary symbol at position k and the bit at position k, respectively, f(k) designates an integer equal to k−1 at most and $\oplus$ designates the exclusive-OR operation, each estimate of a binary symbol ($a_k$) at position k being in the form of a real number $s_k^{(i)}$ ($1 \leq i \leq N$) where the sign of the estimate represents the most probable value of the symbol and the modulus of the estimate measures the likelihood of the most probable value, wherein the receiving device estimates the value of a bit $c_k$ at position k of the sequence on the basis of a number of the form $X_k - Y_k$ where:

$$X_k = \max_{1 \leq i \leq N} \{|s_k^{(i)} + s_{f(k)}^{(i)}|\}$$

-continued $$Y_k = \max_{1 \leq i \leq N} \{|s_k^{(i)} - s_{f(k)}^{(i)}|\}.$$

2. Method according to claim 1, wherein the receiving device produces a hard estimate of each bit ($c_k$) at position k on the basis of the sign of the number $X_k-Y_k$.

3. Method according to claim 1, wherein at least two of the N separate demodulations are performed on the same signal segment corresponding to a frame of symbols ($a_k$) of a digital signal modulated by the transmitting device, the signal segment (r(t)) being received by the receiving device after sending of the modulated digital signal (s(t)) via a transmission channel, in that the first of these two demodulations comprises the following stages:
  estimation of first demodulation parameters ($A_k^A$) at a first end of the segment; and
  calculation of first estimates ($s_k^A$, $b_k^A$) of symbols of the frame on the basis of the first estimated demodulation parameters and of the signal segment covered from the first end to a second end,
and in that the second of these two demodulations comprises the following stages:
  estimation of second demodulation parameters ($A_k^R$) at the second end of the segment; and
  calculation of second estimates ($s_k^R$, $b_k^R$) of symbols of the frame on the basis of the second estimated demodulation parameters and of the signal segment covered from the second end towards the first end.

4. Method according to claim 3, wherein the first demodulation parameters are re-estimated at least once while covering the segment from the first end, and the second demodulation parameters are re-estimated at least once while covering the segment from the second end.

5. Method according to claim 3, wherein the first and second demodulation parameters each comprise at least one parameter ($A_k^A$, $A_k^R$) representing the response of the transmission channel.

6. Method according to claim 5, wherein the receiving device estimates the parameters representing the response of the transmission channel at the ends of the segments on the basis of synchronization sequences included in the digital signal frames.

7. Method according to claim 3, wherein the first and second demodulation parameters each comprise at least one parameter relating to the noise observed on the transmission channel.

8. Method according to claim 7, wherein the first demodulation parameters comprise the power of the noise, the estimate ($N0_k^A$) of which is used to normalize the first estimates of the symbols of the frame, and in that the second demodulation parameters comprise the power of the noise the estimate ($N0_k^R k$) of which is used to normalize the second estimates of the symbols of the frame.

9. Method according to claim 1, wherein at least two of the N separate demodulations are performed over two respective signal segments received by the receiving device according to a diversity technique.

* * * * *